US009898377B2

United States Patent
Thathapudi et al.

(10) Patent No.: US 9,898,377 B2
(45) Date of Patent: *Feb. 20, 2018

(54) SWITCH PROVIDED FAILOVER

(71) Applicant: Juniper Networks, Inc., Sunnyvale, CA (US)

(72) Inventors: Timothy Noel Thathapudi, Bangalore (IN); Siddharth Tuli, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 396 days.

This patent is subject to a terminal disclaimer.

(21) Appl. No.: 14/587,988

(22) Filed: Dec. 31, 2014

(65) Prior Publication Data

US 2015/0113315 A1   Apr. 23, 2015

Related U.S. Application Data

(63) Continuation of application No. 12/914,506, filed on Oct. 28, 2010, now Pat. No. 8,938,516.

(51) Int. Cl.
*G06F 15/16* (2006.01)
*G06F 11/20* (2006.01)
*H04L 12/46* (2006.01)
*H04L 12/24* (2006.01)
*H04L 12/26* (2006.01)

(52) U.S. Cl.
CPC ...... *G06F 11/2023* (2013.01); *H04L 12/4641* (2013.01); *H04L 41/0663* (2013.01); *H04L 43/10* (2013.01)

(58) Field of Classification Search
CPC ............ G06F 11/2023; H04L 12/4641; H04L 41/0663; H04L 43/10
See application file for complete search history.

(56) References Cited

U.S. PATENT DOCUMENTS

| 6,269,076 | B1 * | 7/2001 | Shamir ............... H04L 41/0213 370/216 |
| 7,801,150 | B1 * | 9/2010 | Rupavatharam .. H04L 12/40195 370/392 |
| 2002/0052972 | A1 | 5/2002 | Yim |
| 2003/0217148 | A1 | 11/2003 | Mullen et al. |

(Continued)

OTHER PUBLICATIONS

Co-pending U.S. Appl. No. 12/914,506, entitled "Switch Provided Failover" by Timothy Noel Thathapudi et al., filed Oct. 28, 2010, 42 pages.

*Primary Examiner* — June Sison
*Assistant Examiner* — Steven Nguyen
(74) *Attorney, Agent, or Firm* — Harrity & Harrity, LLP

(57) ABSTRACT

A system is configured to: transmit requests to a first device and a second device; receive a first reply from the first device in response to one of the requests; determine an address of the first device based on the first reply; assign a first port to a first network when the first device is a first one of one or more devices that replied to the requests and have a same address as the first device; receive a second reply from the second device in response to another one of the requests; assign a second port to a second network when the address of the second device is the same as the address of the first device; and reassign the second port, from the second network, to the first network when a failure of the first device occurs.

20 Claims, 6 Drawing Sheets

(56) References Cited

U.S. PATENT DOCUMENTS

| | | | |
|---|---|---|---|
| 2006/0018263 A1* | 1/2006 | McGee | H04L 29/12009 |
| | | | 370/241 |
| 2008/0205402 A1* | 8/2008 | McGee | H04L 29/12839 |
| | | | 370/392 |
| 2010/0110881 A1 | 5/2010 | Ryoo et al. | |
| 2010/0153055 A1* | 6/2010 | Mucha | H04L 12/2697 |
| | | | 702/122 |
| 2010/0189117 A1 | 7/2010 | Gowda et al. | |
| 2010/0254255 A1* | 10/2010 | Devarapalli | G06F 15/16 |
| | | | 370/216 |
| 2011/0004781 A1 | 1/2011 | Howarth | |
| 2012/0011217 A1* | 1/2012 | Weng | H04J 3/0641 |
| | | | 709/209 |
| 2012/0106321 A1* | 5/2012 | Alon | H04L 45/28 |
| | | | 370/221 |

* cited by examiner

SWITCH PROVIDED FAILOVER

RELATED APPLICATION

This application is a continuation of U.S. patent application Ser. No. 12/914,506, filed Oct. 28, 2010, the disclosure of which is incorporated herein by reference.

BACKGROUND

Computing and communication networks typically include various devices, such as servers, switches, or routers, which may receive, provide, process, or transfer data. A device may malfunction or go out of service. In order to maintain functioning of the device, the network may contain a backup for the device, which may take over when the device malfunctions or goes out of service. To do so (i.e., provide failover), an administrator (e.g., network administrator, any person responsible for the operation of a device) needs to set up a master-slave system, where a device may act as a master and a corresponding backup device may act as a slave. Failover provides the ability to use the slave instead of the master when the master fails.

A master and a slave may connect directly via one or more dedicated wires or via a bus. The use of dedicated wires may make the number of connecting wires unmanageable. An administrator may need to install, setup, and configure failover packages, protocols (e.g., election software to determine which device is the master, heartbeat software to determine when the master fails, Virtual Router Redundancy Protocol (VRRP), Common Address Redundancy Protocol (CARP), etc.), and/or configuration files (herein, collectively referred to as "failover packages") on each individual device that may act as a master or a slave. As a result, the costs of deployment and know-how required to set up a master-slave system are exceedingly high. Furthermore, some devices may not support certain features of protocols and/or signals (e.g., Gratuitous Address Resolution Protocol (ARP) messages) required by various available failover packages. As a result, the failover mechanism provided by the installed failover packages may fail. Configuring devices to support some of the failover packages (e.g., to handle gratuitous ARP) may also negatively affect security. The available failover packages and protocols may also slow down failover by requiring devices acting as masters and slaves to store ARP caches. In addition, a master-slave system with a heartbeat running between a master and a slave may provide for only a single point of failure. As a result, for example, a split brain may occur where multiple devices begin to act as masters at the same time.

SUMMARY

According to one aspect, a method may include receiving a first message from a first device, where the first device has a particular virtual media access control (VMAC) address; determining that no other message has been received, prior to the first message, from any device with the particular VMAC address; assigning the first device to a first virtual local area network (VLAN) based on the first message and the determination that no other message has been received, prior to the first message, from any device with the particular VMAC address; receiving a second message from a second device, where the second device also has the particular VMAC address; determining that the first device has already been assigned to the first VLAN; assigning the second device to a second VLAN based on the second reply and the determination that the first device has already been assigned to the first VLAN; detecting whether a failure of the first device has occurred; and reassigning the second device to the first VLAN when the failure of the first device has occurred.

According to another aspect, a non-transitory computer-readable medium may store a program for causing a computer to perform a method. The method may include transmitting a first request to a first device and a second request to a second device; identifying the first device as a master device based on receiving a first reply, to the first request, from the first device prior to receiving a second reply to the first request, from the second device; assigning a first port corresponding to the first device to a first virtual network, where the first virtual network is reserved for masters devices; identifying the second device as a slave device based on receiving the second reply, to the second request, from the second device after receiving the first reply from the first device; assigning a second port corresponding to the second device to a second virtual network, where the second virtual network is reserved for slave devices and differs from the first virtual network; detecting a failure of the first device; and reassigning the second port, from the second virtual network, to the first virtual network in response to the failure.

According to yet another aspect, a switch may include a memory; a first port to connect to a first device; a second port to connect to a second device; and a processor. The processor may transmit requests to the first device and the second device; receive a first reply from the first device in response to one of the requests; determine an address of the first device based on the first reply; assign the first port to a first network when the first device is a first one of one or more devices that replied to the requests and have a same address as the first device; receive a second reply from the second device in response to another one of the requests; assign the second port to a second network when the address of the second device is the same as the address of the first device; and reassign the second port, from the second network, to the first network when a failure of the first device occurs.

According to still yet another aspect, a computer system may include: means for identifying a first device as a master device based on a first reply to a first request; means for assigning a first port, corresponding to the first device, to a first network, where the first network is reserved for masters devices; means for identifying a second device as a slave device based on a second reply to a second request, where an address corresponding to the first device is equal to an address corresponding to the second device; means for assigning a second port, corresponding to the second device, to a second network, where the second network is reserved for slave devices and differs from the first network; and means for reassigning the second port, from the second network, to the first network when a failure of the first device is detected.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

Figure 1:
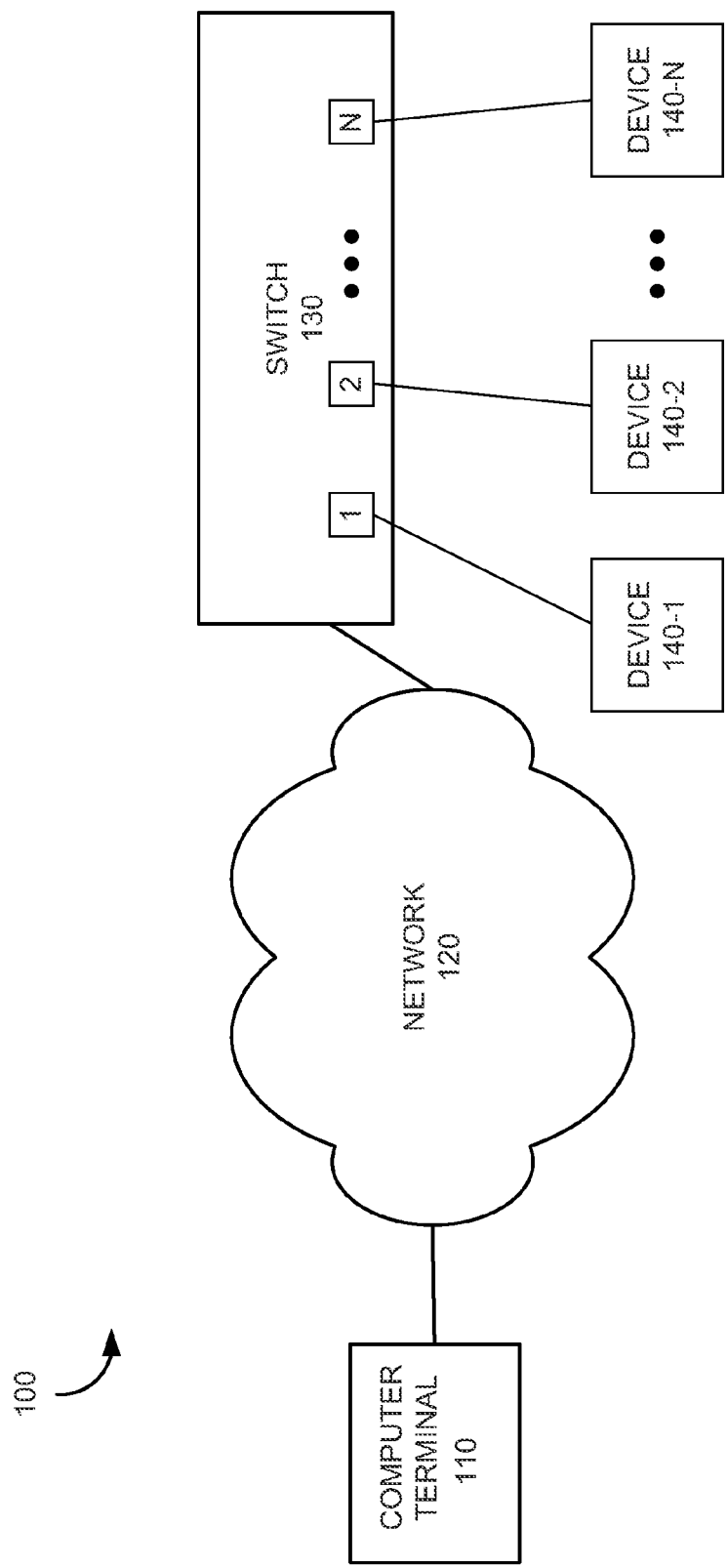
FIG. 1 is a diagram of an example environment in which systems and/or methods described herein may be implemented.

The following detailed description refers to the accompanying drawings. The same reference numbers in different drawings may identify the same or similar elements. Also, the following detailed description does not limit the invention.

An implementation, described herein, may provide a failover mechanism provided by a switch (herein, a switch may refer to any device that connects another device directly or indirectly to a network (e.g., a switch may receive a packet from the Internet and forward it to a device connected to the switch)) for two or more other devices with identical virtual Media Access Control (VMAC) addresses. The term "packet," as used herein, may refer to and be used interchangeably with request, message, ping, traffic, data, datagram, or cell; a fragment of a packet, a fragment of a datagram, a fragment of a cell; or another type, arrangement, or packaging of data.

A communication interface of a device in a network is typically assigned a unique real Media Access Control (RMAC) address to ensure that all devices in a network have distinct addresses. An RMAC address is also known as a hardware address or a physical address that uniquely identifies a device. An RMAC address may be programmed by the device manufacturer.

A VMAC address is a unique identifier that may be assigned by an administrator to one or more devices. In another implementation, an administrator may create and/or execute a script to assign VMAC address(es) to different devices. The same VMAC address may be assigned to multiple devices. For example, a master and a slave may be assigned the same VMAC address.

An RMAC address or a VMAC address may include a twelve digit hexadecimal number (forty-eight bits in length). The first half of an RMAC address may contain the identification number of the device manufacturer, and the second half of an RMAC address may represent the serial number assigned to the device by the manufacturer (e.g., written in the following format MM:MM:MM:SS:SS:SS or MM-MM-MM-SS-SS-SS). An example of a VMAC address may include: 00:00:5E:xx:xx:10.

A communication interface of a device may also be assigned an Internet Protocol (IP) address. An IP address is an identifier for a device on a network (e.g., a TCP/IP network). Networks using a TCP/IP protocol may route information based on the IP address of the destination. An IP address may be virtual or real. A real IP (RIP) address may be used by the network device upon which a process is executing. A virtual IP (VIP) address is an IP address that may be shared among multiple devices. For example, a master and a slave may be assigned the same VIP address. A packet sent to a VIP address may be redirected to one of the physical devices assigned the VIP address.

An RIP address or a VIP address may be represented as 32-bit numeric address written as four numbers separated by periods. Each number may be zero to 255. For example, 192.168.1.10 may be a VIP address.

A communication interface of a device may be connected to a port on a switch. A switch may include a group of ports. A switch may learn the VIP and VMAC addresses of devices connected to the ports of the switch.

Virtual local area networks (VLANs) may be configured on particular ports of one or more switches. VLANs can group together devices that may be connected to different physical switches and can divide devices connected to the same physical switch between different VLANS. For example, different ports of a switch may be assigned to different VLANs. As described herein, assigning a port to a VLAN may refer to assigning a VLAN ID, corresponding to a VLAN, to a port. Reserving a VLAN may refer to reserving a VLAN ID. A VLAN may be represented by an ID ranging from 0 to 255 (herein, for example, a reference to a VLAN with an ID of 1 may be referred to as VLAN 1). Ports of a switch that are connected to devices that are acting as masters may be assigned to one VLAN, and, ports of a switch that are connected to devices that are acting as slaves may be assigned to another VLAN. For example, VLAN 1 may be reserved for masters/primary devices and VLAN 255 may be reserved for slaves/backup devices. A port connecting a master to a switch may be assigned to VLAN 1, and, a port connecting a slave to a switch may be assigned to VLAN 255.

A device (including a device that is a switch) may send a keepalive/heartbeat message to another device. The keepalive/heartbeat message allows for the device sending the message to determine that the link between the two devices is operating.

FIG. 1 is a diagram of an example environment 100 in which systems and/or methods described herein may be implemented. Environment 100 may include one or more of the following elements: computer terminal 110, network 120, switch 130, and network devices 140-1, 140-2, . . . , 140-N (collectively referred to as "devices 140" and individually as "device 140"). In practice, environment 100 may include additional elements, fewer elements, different elements, or differently arranged elements than are shown in FIG. 1. Also, one or more elements of environment 100 may perform the tasks described as being performed by one or more other elements of environment 100.

Computer terminal 110 may represent any device capable of receiving data from and/or transmitting data to network 120. Computer terminal 110 may allow a user to prompt computer terminal 110 to receive/transmit the data. In one implementation, computer terminal 110 may take the form of a computer, a switch, a smart phone, a personal computer, a laptop, a handheld computer, a portable communication device (e.g., a mobile phone), an access point base station, etc. Computer terminal 110 may be directly connected to network 120 or indirectly connected through a router, a switch, a bridge, a firewall, a gateway, etc.

Network 120 may include a single network, multiple networks of a same type, or multiple networks of different types. For example, network 120 may include one or more of a direct connection between devices, a local area network (LAN), a wide area network (WAN), a metropolitan area network (MAN), a wireless network, such as a general packet radio service (GPRS) network, an ad hoc network, a public switched telephone network (PSTN), a subset of the Internet, any other network, or any combination thereof.

Switch 130 may represent any device capable of receiving data from network 120, transmitting the data to one or more of devices 140, and/or transmitting data from one or more of devices 140 to network 120. Switch 130 may take the form of a server, a router, a switch, a bridge, a firewall, a gateway, etc. Switch 130 may include one or more ingress ports (not shown in FIG. 1) and one or more egress ports (egress ports are illustrated as ports 1, 2, . . . , N and are collectively referred to below as ports 1 through N). Switch 130 may receive data at one of the ingress ports from network 120, determine a destination (e.g., one of devices 140) of the data, determine an egress port (one of ports 1 through N) based on the determined destination, and forward the data to one of devices 140 via the determined egress port. Each one of the egress ports (ports 1 through N) may connect to one of devices 140. For example, a port 1 may connect to device 140-1, a port 2 may connect to device 140-2, . . . , and a port N may connect to device 140-N. One or more of ports 1 through N may not be connected to any device. An administrator may physically alter which one of devices 140 is connected to which one of ports 1 through N at a point in time.

Devices 140 may be of a same type of as computer terminal 110 and/or switch 130 or of different types. In one implementation, each one of devices 140 may take the form of any computer, including a server (e.g., web server, file server, etc.), a network interface card (NIC), etc. One or more of devices 140 may be a different type of device than the other ones of devices 140. One or more of devices 140 may process a request (e.g., data) that may be sent from computer terminal 110. The one or more of devices 140 may transmit a response (e.g., data) back to computer terminal 110 through switch 130 and network 120 in response to the request. In another implementation, devices 140 may be connected to different switches that are connected through one or more networks.

One or more of devices 140 may be a device that may act as a master and/or a slave. For example, devices 140-1 and 140-2 may be devices of a same type that perform the same function(s). An administrator may assign identical VMAC (and VIP) addresses to devices 140-1 and 140-2 for one of devices 140-1 and 140-2 to act as a master and for the other one of devices 140-1 and 140-2 to act as a slave. In other words, the setup by the administrator may allow one of devices 140-1 and 140-2 to act as a backup device when the other one of devices 140-1 and 140-2, which was previously performing the functions needed by the type of device, fails.

Switch 130 may first learn a VMAC address of device 140-1 that is connected to port 1. In one implementation, switch 130 may first learn the VMAC address of device 140-1 by receiving a layer 2 message (e.g., an Internet Control Message Protocol (ICMP) message) as a reply to an ICMP request that was sent to device 140-1. In another implementation, switch 130 may first learn the VMAC address of device 140-1 by receiving an ARP message (e.g., ARP request or reply) that was sent by device 140-1, not in response to any request, when the VMAC address was configured or changed on device 140-1. Switch 140-1 may determine the VMAC address based on/by using the header of the ICMP or ARP message received from device 140-1. If switch 130 does not know of any other device with the VMAC address, switch 130 may assign port 1 (and with it device 140-1) to VLAN 1 (VLAN 1 may be allocated (e.g., by the administrator) for primary device(s) (that act as master(s))).

Switch 130 may then learn the VMAC address of device 140-2 that is connected to port 2 (switch 130 may then learn the VMAC address of device 140-2 in one of the multiple ways that switch 130 may learn the VMAC address of device 140-1, as discussed above). When switch 130 recognizes that the VMAC address of device 140-2 is the same as the VMAC address of device 140-1, switch 130 may assign port 2 to backup VLAN 255 (VLAN 255 may be allocated for backup device(s) (that act as slave(s))). As a result, device 140-1 may act as a master and device 140-2 may act as a slave to device 140-1.

Switch 130 may send requests (e.g., ICMP messages/pings) to devices 140 to monitor that each one of devices 140 continues to operate properly. Switch 130 may not receive a reply (e.g., a predefined number of ICMP replies within a predefined period of time) from device 140-1 that is acting as a master. In response, switch 130 may reassign port 2 to VLAN 1 because device 140-2, connected to port 2, was acting as a slave in relation to device 140-1. As a result, device 140-2 may act as a master/primary device. During the reassigning, switch 130 may cache data destined to a VMAC address assigned to devices 140-1 and 140-2. After the reassigning, switch 130 may transmit the cached data to device 140-2. Thereafter, switch 130 may learn that device 140-1 is back up and has the same VMAC address as, now, primary device 140-2. In response, switch 130 may assign port 1 that is connected to device 140-1 to VLAN 255. As a result, device 140-2 may now act as a master and device 140-1 may act as a slave to device 140-2.

In another implementation, for example, switch 130 may then learn that device 140-N has the same VMAC address as devices 140-1 and 140-2. Accordingly, switch 130 may assign port N, connected to device 140-N, also to VLAN 255 (or to another VLAN (e.g., VLAN 254) reserved for slaves). Thereafter, device 140-N may also act as a slave to device 140-2 that acts as a master. If devices 140-1 and 140-2 both fail, device 140-N may take over as a primary device and then act as a master.

In another implementation, one or more of devices 140 may also be connected to a second switch (not shown in FIG. 1). The second switch may also include individual ports that correspond to each one of devices 140. The second switch may behave/work completely independently of switch 130 (e.g., in parallel with switch 130) or together with switch 130, and may perform the same functions as switch 130. Herein, any reference to switch 130 may refer also to the second switch, or switch 130 and the second switch performing an action together or independently. For example, the second switch may independently transmit heartbeats to devices 140 along with switch 130. When switch 130 fails, the second switch may take over the functions of switch 130. As a result, there are multiple redundancies (more than a single point of failure) for system 100.

In yet another implementation, multiple devices (e.g., device 140-1 and device 140-2) may be connected to a single port (e.g., port 1). Switch 130 may assign individual devices to different VLANs instead of assigning ports to VLANs. Alternatively, each one of the ports 1 through N may be connected to multiple devices when none of the multiple devices has the same VMAC address. Additionally, all devices connected to one port may respond, to messages sent from switch 130 to all devices connected to switch 130 through ports 1 through N, before any other device connected to another port.

Figure 2:
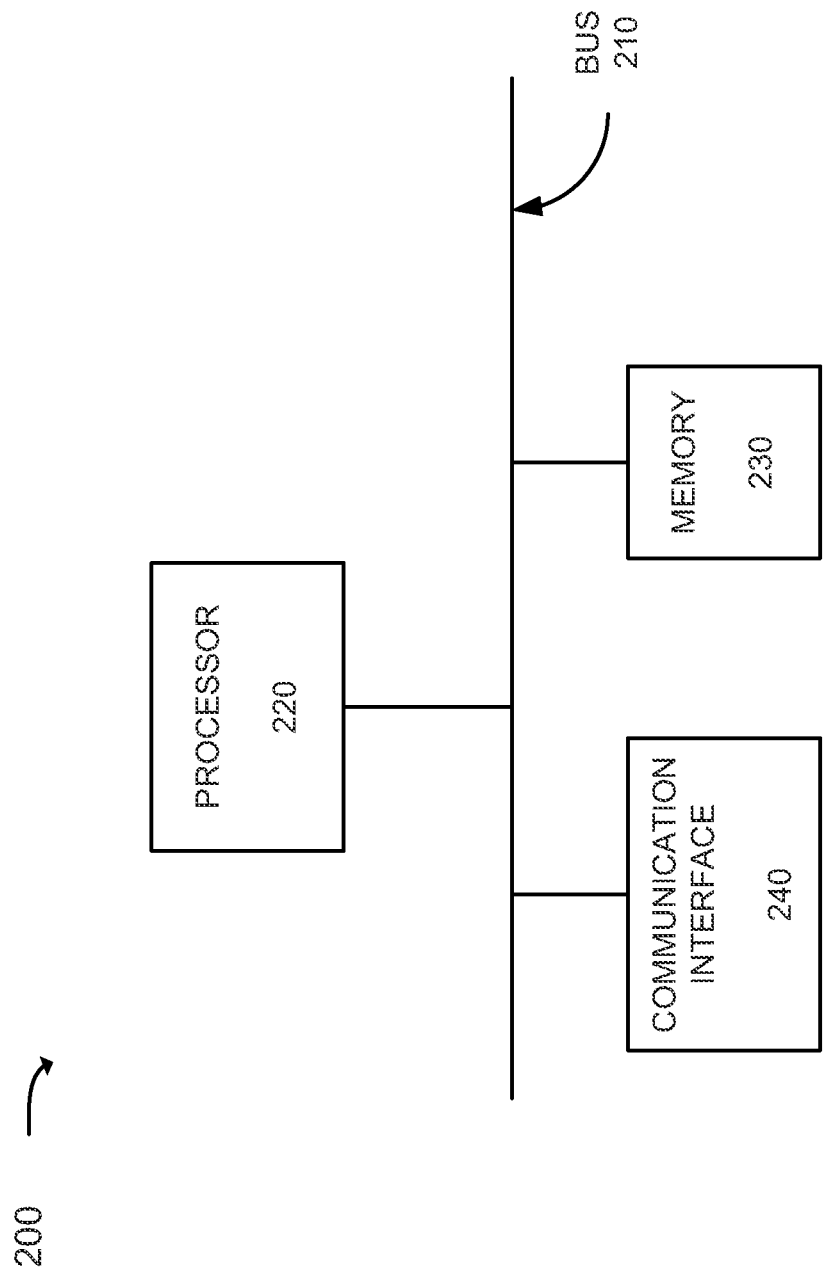
FIG. 2 is a diagram of example components of one or more of the devices of FIG. 1.

FIG. 2 is a diagram of example components of a device 200 that may be associated with computer terminal 110, switch 130, or device 140. Each of computer terminal 110, switch 130, and device 140 may include one or more devices 200. As shown in FIG. 2, device 200 may include a bus 210, a processor 220, a memory 230, and a communication interface 240. In another implementation, device 200 may include additional components, fewer components, different components, or differently arranged components than are shown in FIG. 2. For example, device 200 may include input and output components.

Bus 210 may include a path that permits communication among the components of device 200. Processor 220 may include a processor, microprocessor, or processing logic that may interpret and execute instructions. Memory 230 may include a random access memory (RAM), a read only memory (ROM) device, a magnetic and/or optical recording medium and its corresponding drive, and/or another type of static and/or dynamic storage device that may store information and instructions for execution by processor 220. Communication interface 240 may include any transceiver-like mechanism that enables device 200 to communicate with other devices and/or networks. For example, communication interface 240 may include a network card, such as a network interface card (NIC) and/or an Ethernet device, such as an Ethernet NIC.

Device 200 may perform certain operations, as described in detail below. Device 200 may perform these operations in response to processor 220 executing software instructions (e.g., computer program(s)) contained in a computer-readable medium, such as memory 230, a secondary storage device (e.g., hard disk, CD-ROM, etc.) or other forms of RAM or ROM. A computer-readable medium may be defined as a non-transitory memory device. A logical memory device may include memory space within a single physical memory device or spread across multiple physical memory devices.

The software instructions may be read into memory 230 from another computer-readable medium, such as a data storage device, or from another device via communication interface 240. The software instructions contained in memory 230 may cause processor 220 to perform processes that will be described later. Alternatively, hardwired circuitry may be used in place of or in combination with software instructions to implement processes described herein. Thus, implementations described herein are not limited to any specific combination of hardware circuitry and software.

Figure 3:
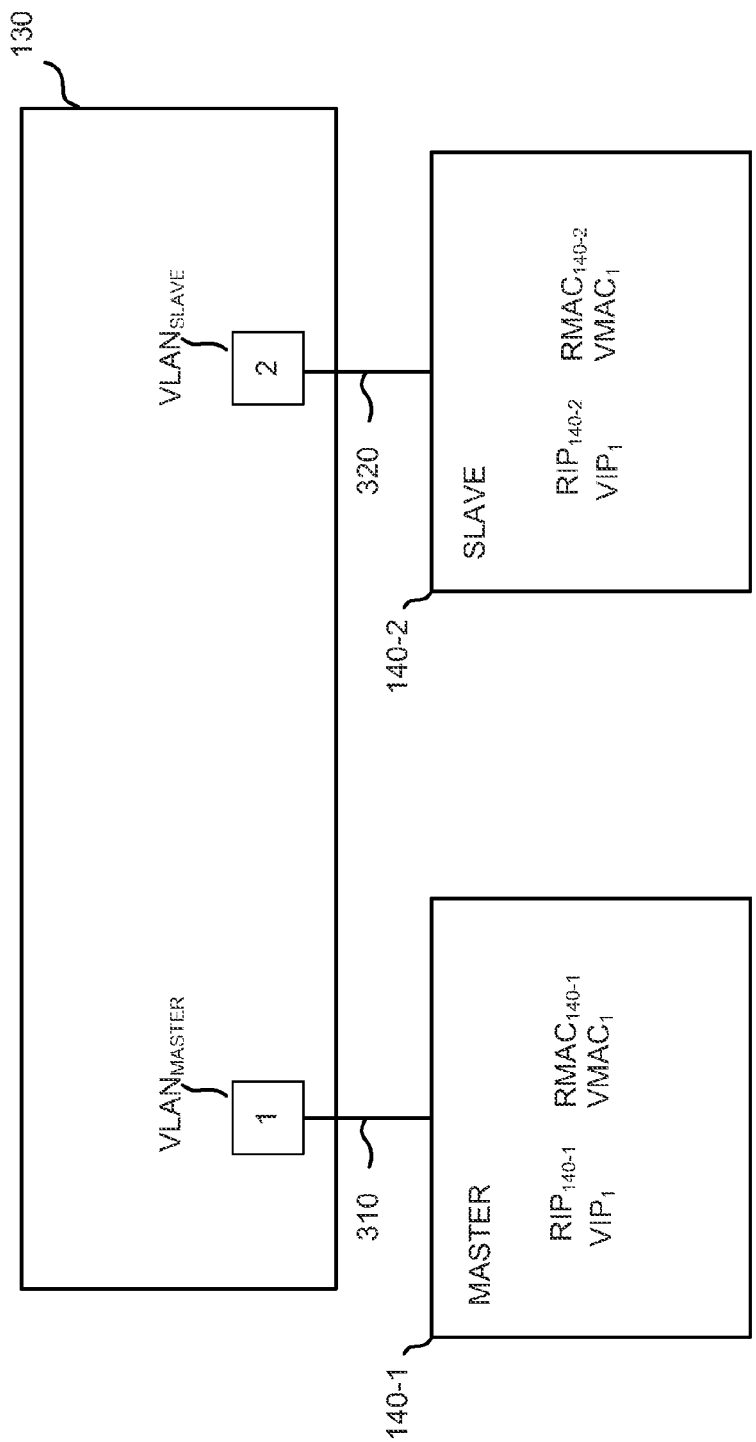
FIGS. 3 and 4 are diagrams illustrating examples of an operation of a portion of the environment in FIG. 1.
Figure 4:
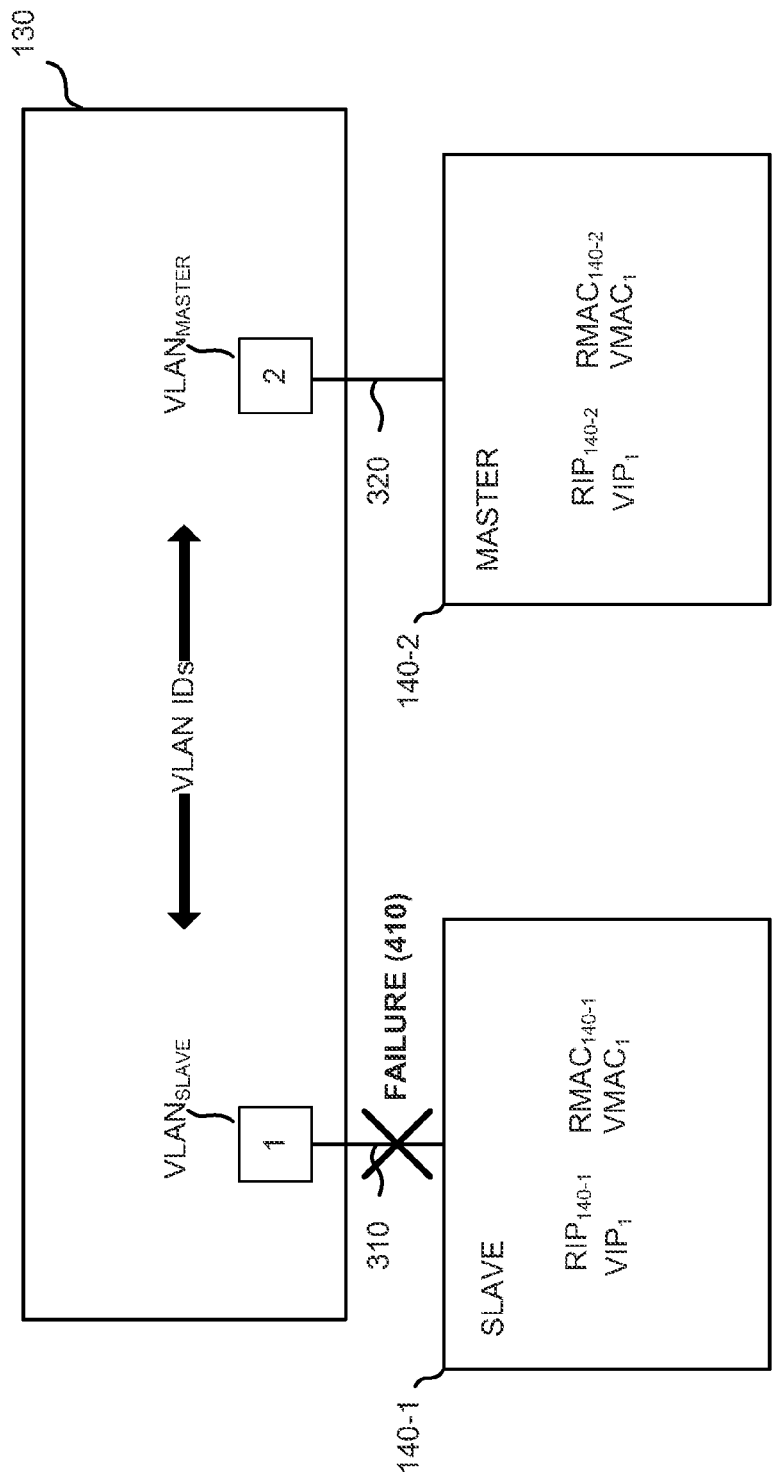

FIGS. 3 and 4 are diagrams illustrating an example of an operation of a portion of environment 100. As shown in FIG. 3, device 140-1 may act as a master (Master) and device 140-2 may act as one of one or more slaves (Slave). Each one of devices 140-1 and 140-2 may include communication interface 240. Communication interface 240 of device 140-1 may connect to port 1 with a cable 310 to switch 130, and communication interface 240 of device 140-2 may connect to port 2 with a cable 320 to switch 130. Device 140-1 may store an RIP address ($RIP_{140-1}$) and an RMAC address ($RMAC_{140-1}$) that are unique to device 140-1. Device 140-2 may store an RIP address ($RIP_{140-2}$) and an RMAC address ($RMAC_{140-2}$) that are unique to device 140-2.

An administrator may set up devices 140-1 and 140-2 to perform the same operations/functions of a first device (e.g., a specific file server, web server, etc.). The administrator and/or switch 130 may assign the same VIP address ($VIP_1$) and VMAC address ($VMAC_1$) to devices 140-1 and 140-2. As a result, one of devices 140-1 and 140-2 may act as a master and the other one of devices 140-1 and 140-2 may act as a slave (backup device in case the master fails). A failover software/package may be installed on switch 130 to manage failover when one of devices 140-1 and 140-2 fails.

Switch 130 may snoop to learn the VMAC addresses of the devices, including, devices 140-1 and 140-2, connected to switch 130 through its ports, including ports 1 and 2. Switch 130 may transmit request messages to device 140-1 through cable 310 and to device 140-2 through cable 320.

Device 140-1 may send a reply message, in response to a request message, through cable 310 to switch 130. Switch 130 may determine the VMAC address ($VMAC_1$) of device 140-1 based on the reply message. Switch 130 may then determine whether it has received a reply message from any other device connected to a port of switch 130 with a VMAC address of $VMAC_1$. Switch 130 may assign port 1, connected through cable 310 to device 140-1, to a VLAN reserved for masters/primary devices ($VLAN_{MASTER}$ (e.g., VLAN 1)) when switch 130 determines that switch 130 has not established a connection, through one of its ports, with any other device with the same VMAC address as that of device 140-1. Device 140-1 may now act as a master (in relation to devices with the same VMAC address of $VMAC_1$).

In another implementation, switch 130 may perform further actions to determine that device 140-1 may actually perform functions required by a device with the VMAC address of $VMAC_1$ (before identifying device 140-1 as a master primary/device or identifying another device as a slave device, as discussed below). This may be necessary, for example, in case device 140-1 was mistakenly assigned an incorrect VMAC address.

Thereafter, device 140-2 may send a reply message, in response to a request message, through cable 310 to switch 130. Switch 130 may determine the VMAC address ($VMAC_1$) of device 140-2 based on the reply message. Switch 130 may then determine that device 140-2 has the same VMAC address, $VMAC_1$, as device 140-1. As a result, switch 130 may assign port 2, connected through cable 320 to device 140-2, to a VLAN reserved for slave devices ($VLAN_{SLAVE}$ (e.g., VLAN 255)). Device 140-2 may now act as a slave in relation to device 140-1 that is now acting as a master.

In another implementation, switch 130 may initially wait to receive replies from multiple devices with the same VMAC address. Switch 130 may prioritize which one of the devices will act as a master (and the other(s) act as a slave) based on a variety of factors besides which device sent a reply first to switch 130.

Also, switch 130 may receive replies from multiple devices at a same time. Switch 130 may use an algorithm to determine an order for the replies. For example, a first reply may arrive from device 140-1, connected to port 1, at the same time as a second reply from device 140-2, connected to port 2. Switch 130 may determine an order where the first reply is treated as if it arrived before the second reply because the number of port 1 is lower than the number of port 2.

Switch 130 may continue to send requests (e.g., ICMP pings, TCP keepalives) as heartbeats to devices 140-1 and 140-2 through cables 310 and 320, respectively. The heartbeats allow switch 130 to determine whether devices 140-1 and 140-2 are up (e.g., continuing to operate properly).

FIG. 4 is a diagram illustrating an example of an operation of a portion of environment 100 when device 140-1 fails. Switch 130 may transmit a request as a heartbeat to device 140-1 through cable 310 that connects port 1 of switch 130 to device 140-1. Switch 130 may not receive a reply to the request or may not receive a proper reply to the request (e.g., not receiving a reply or not receiving a proper reply may refer to not receiving a predefined number of, for example, ICMP replies, in response to a predefined number of ICMP messages within a predefined period of time). As a result, switch 130 may diagnose/determine a failure 410 of device 140-1.

Switch 130 may then proceed to assign another device with VMAC address of $VMAC_1$ as the new master/primary device. Since device 140-2 was another device, after device 140-1, with VMAC address of $VMAC_1$, to send a reply to the original request from switch 130, switch 130 may assign device 140-2 to act as the new master (after the previous master, device 140-1, fails (i.e., after switch 130 determines failure 410)). To do so, switch 130 may assign port 2, connected through cable 320 to device 140-2, to a VLAN reserved for primary/master devices ($VLAN_{MASTER}$). During the time period, while device 140-2 is becoming a master (after switch 130 determines failure 410 and before device 140-2 begins to act as a master), switch 130 may cache the traffic that is being sent to a device with a VMAC address of $VMAC_1$ connected to a port assigned to $VLAN_{MASTER}$. After device 140-2 begins to act as a master, switch 130 may proceed to transmit the cached traffic, destined for a device with a VMAC address of $VMAC_1$ connected to a port assigned to $VLAN_{MASTER}$, to device 140-2.

After device 140-2 becomes a master, switch 130 may continue to send requests (e.g., ICMP pings) to device 140-1 through cable 310 in order to determine if device 140-1 is back up (e.g., able to operate). Device 140-1 may eventually send a reply to switch 130, through cable 310, in response to one of the requests from switch 130. Switch 130 may then determine if the VMAC address of device 140-1 has remained the same (i.e., that the VMAC address of device 140-1 is $VMAC_1$, like that of device 140-2). If the VMAC address of device 140-1 remains $VMAC_1$, then switch 130 may assign port 1, connected through cable 310 to device 140-1, to a VLAN reserved for slave devices ($VLAN_{SLAVE}$). Device 140-1 may now act as slave in relation to device 140-2 that is now acting as a master. As a result, after the failure, port 1 and port 2 may switch the VLANs to which they are assigned (i.e., port 1 may now be assigned to $VLAN_{SLAVE}$ and port 2 may be assigned to $VLAN_{MASTER}$).

Figure 5:
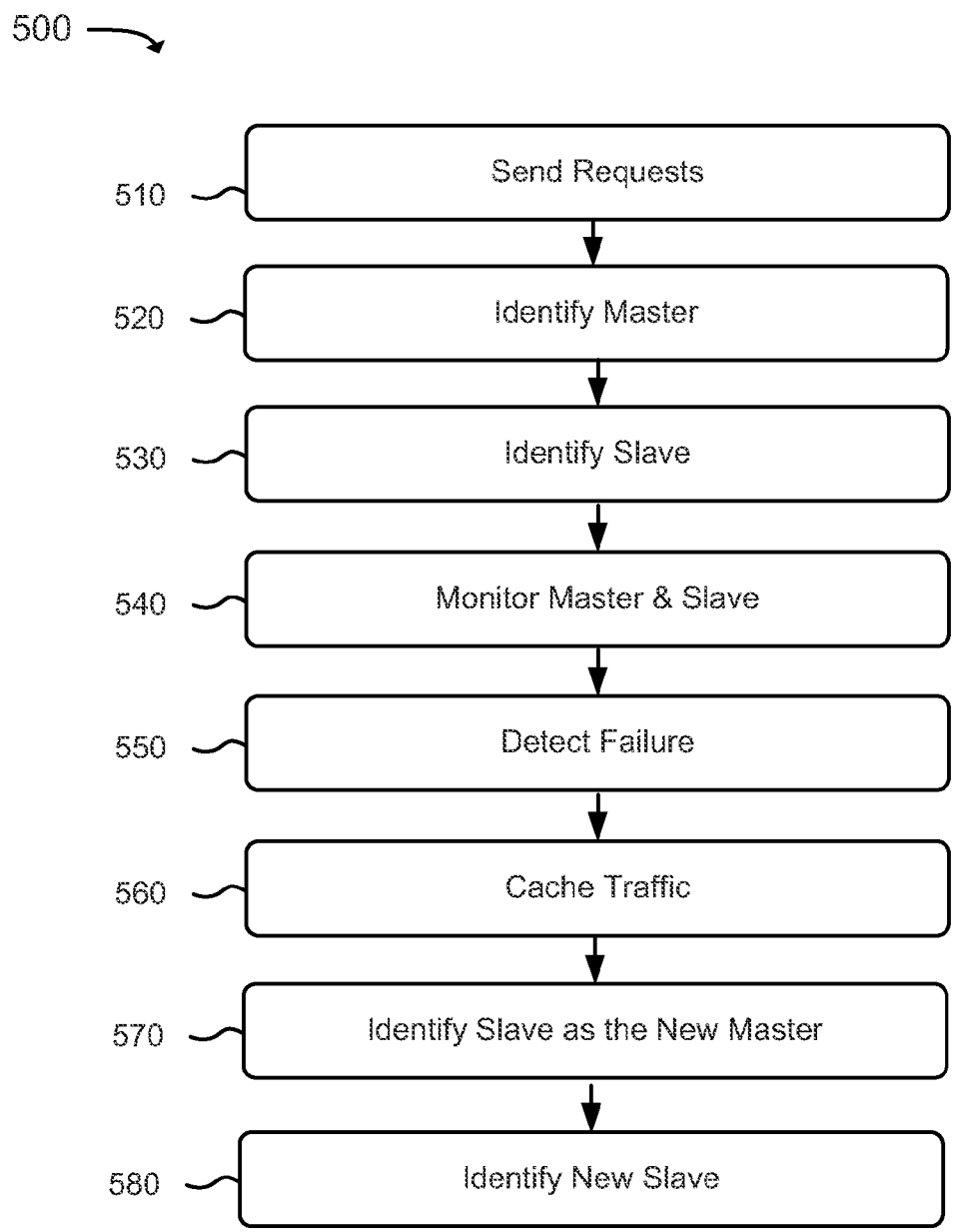
FIG. 5 is a flowchart of an example process for providing failover within an example portion of the environment of FIG. 1.

FIG. 5 is a flowchart of an example process 500 for providing failover within an example portion of environment 100. In one implementation, process 500 may be performed by switch 130. In another implementation, some or all of process 500 may be performed by another device, or a group of devices separate from or including switch 130.

Process 500 of FIG. 5 may include powering up (e.g., booting up) of switch 130. Process 500 may include sending requests (block 510). Switch 130 may snoop to determine what devices 140 are connected to switch 130 through ports 1 through N of switch 130. To do so, switch 130 may send requests (e.g., in form of ICMP messages/pings, ARP messages, etc.) or to devices 140 to determine the VMAC addresses of devices 140.

A master may be identified (block 520). One of devices 140, for example device 140-1, may send a reply (e.g., a layer 2 packet, such as an ICMP reply) in response to one of the requests sent by switch 130. Switch 130 may receive the reply and determine a VMAC address of device 140-1 based on, for example, a header of the reply. Switch 130 may then determine whether a VLAN reserved for masters (e.g., VLAN 1) is assigned to any ports that are connected to a device with the same VMAC address of device 140-1. Originally, if switch 130 has not received a reply from any other devices, then there are no ports assigned to VLAN 1 corresponding to devices with the same VMAC address of device 140-1. Accordingly, switch 130 may identify device 140-1 as a master and assign a port (e.g., port 1) corresponding to device 140-1 to VLAN 1. Switch 130 may forward all traffic (e.g., data, packets, etc. received from a network) destined for a device with the VMAC address of device 140-1 to device 140-1 for processing, storing, etc.

A slave may be identified (block 530). One of devices 140, for example device 140-2, may also send a reply in response to one of the requests sent by switch 130. Assume that switch 130 receives the reply from device 140-2 after receiving the reply from device 140-1. Switch 130 may determine, based on, for example, a header of the reply from device 140-2, a VMAC address of device 140-2. Switch 130 may then determine that a port connected to another device (device 140-1) with the same VMAC address as that of device 140-2 is already assigned to VLAN 1. Accordingly, switch 130 may identify device 140-2 as a slave (in relation to device 140-1 that is acting as a master). Switch 130 may assign a port (e.g., port 2) corresponding to device 140-2 to a VLAN reserved for slave devices (e.g., VLAN 255). Switch 130 may continue to forward all traffic destined for a device with the VMAC address of devices 140-1 and 140-2 to device 140-1 for processing, storing, etc. Device 140-2 may act as a backup device to device 140-1 (device 140-2 may take over if/when device 140-1 fails (ceases to operate properly)).

The master (device 140-1) and the slave (device 140-2) may be monitored (block 540). Switch 130 may transmit messages (e.g., ICMP pings) at predefined time intervals to the master and the slave as heartbeats. Switch 130 may receive replies (e.g., ICMP pings) from the master and the slave in response to the messages.

A failure may be detected (block 550). After transmitting one or more messages as heartbeats to the master (device 140-1), switch 130 may expect to receive a reply (e.g., ICMP ping) from the master. Switch 130 may determine that the master has failed to transmit a reply or a predefined number of replies within a predefined period of time to one or more messages sent to the master. In another implementation, switch 130 may determine that the master has failed to transmit a proper reply that indicates that the master is operating properly. Switch 130 may detect a failure of the master based on failing to receive a reply or receiving an improper reply. In response to detecting the failure (of device 140-1), switch 130 may determine that device 140-1 may no longer act as a master in relation to other devices with the VMAC address of device 140-1.

Switch 130 may also expect to receive a reply (e.g., ICMP ping) from the slave (device 140-2) in response to the heartbeat messages. Switch 130 may determine that the slave has failed to transmit any reply or a proper reply within a predefined period of time to one or more heartbeat messages sent to the slave. Switch 130 may detect a failure of the slave (device 140-2) based on not receiving a reply or receiving an improper reply. Detecting the failure may prompt switch 130 to decide that device 140-2 may no longer act as a slave in relation to other devices with the VMAC address of device 140-2. As a result, device 140-2 may not act as a backup device of device 140-1 that is acting as a master (i.e., device 140-2 may not take over if a failure of device 140-1 is detected, as described above). Device 140-2 may be identified as a slave again (see description of block 530) thereafter.

In a situation where the master has failed, traffic may be cached (block 560). Switch 130 may receive traffic from a network (e.g., network 120) or from another computer system. Switch 130 may determine based on the traffic, a VMAC address of a device that needs to process (e.g., store data, provide a response to a reply) the traffic. When switch 130 detects a failure of the master (device 140-1), switch 130 may cache all traffic destined to a device with the VMAC address of device 140-1. Caching may include storing the traffic on a storage device in switch 130, a storage device connected to switch 130, or in a remote location.

The slave (device 140-2) may be identified as a new master (block 570). After detecting a failure of the master (device 140-1), switch 130 may determine whether a port, connected to another device with a VMAC address of device 140-1, is assigned to one of the VLANs reserved for slaves (VLAN 255). Switch 130 may identify that device 140-2 has the same VMAC address as device 140-1 and that port 2, corresponding to device 140-2, is assigned to VLAN 255. Switch 130 may reassign (automatically after detecting the failure of the master, device 140-1) port 2, connecting device 140-2 to switch 130, to VLAN 1, which is reserved for ports connected to devices acting as masters. As a result, device 140-2 may act as a master. Switch 130 may now forward the cached traffic (and any new traffic) destined for a device with the VMAC address of devices 140-1 and 140-2 to device 140-2.

A new slave may be identified (block 580). Switch 130 may continue to transmit messages/requests as heartbeats to device 140-1 even after detecting the failure of device 140-1 (when it was acting as a master). Device 140-1 may reply to one of the messages/requests. Switch 130 may receive the reply and determine, based on the reply, the VMAC address of device 140-1. Switch 130 may determine whether a port, connecting a device with the VMAC address of device 140-1 to switch 130, is already assigned to the VLAN reserved for masters (VLAN 1). Port 2, connecting device 140-2 to switch 130, may be assigned to VLAN 1 since device 140-2 may be acting as a master. After determining that device 140-2 is acting as a master in relation to other devices with the VMAC addresses of devices 140-1 and 140-2, switch 130 may assign port 1, connecting device 140-1 to switch 130, to the VLAN reserved for slaves (VLAN 255). Device 140-2 may now act as a slave in relation to device 140-2 that acts as a master of devices with the VMAC address of devices 140-1 and 140-2. Device 140-1 may take over for device 140-2 as a master if/when switch 130-1 detects a failure of device 140-2 in the future. Overall, between blocks 520-580, device 140-1 and device 140-2 may switch roles of acting as a master and acting as a slave.

Figure 6:
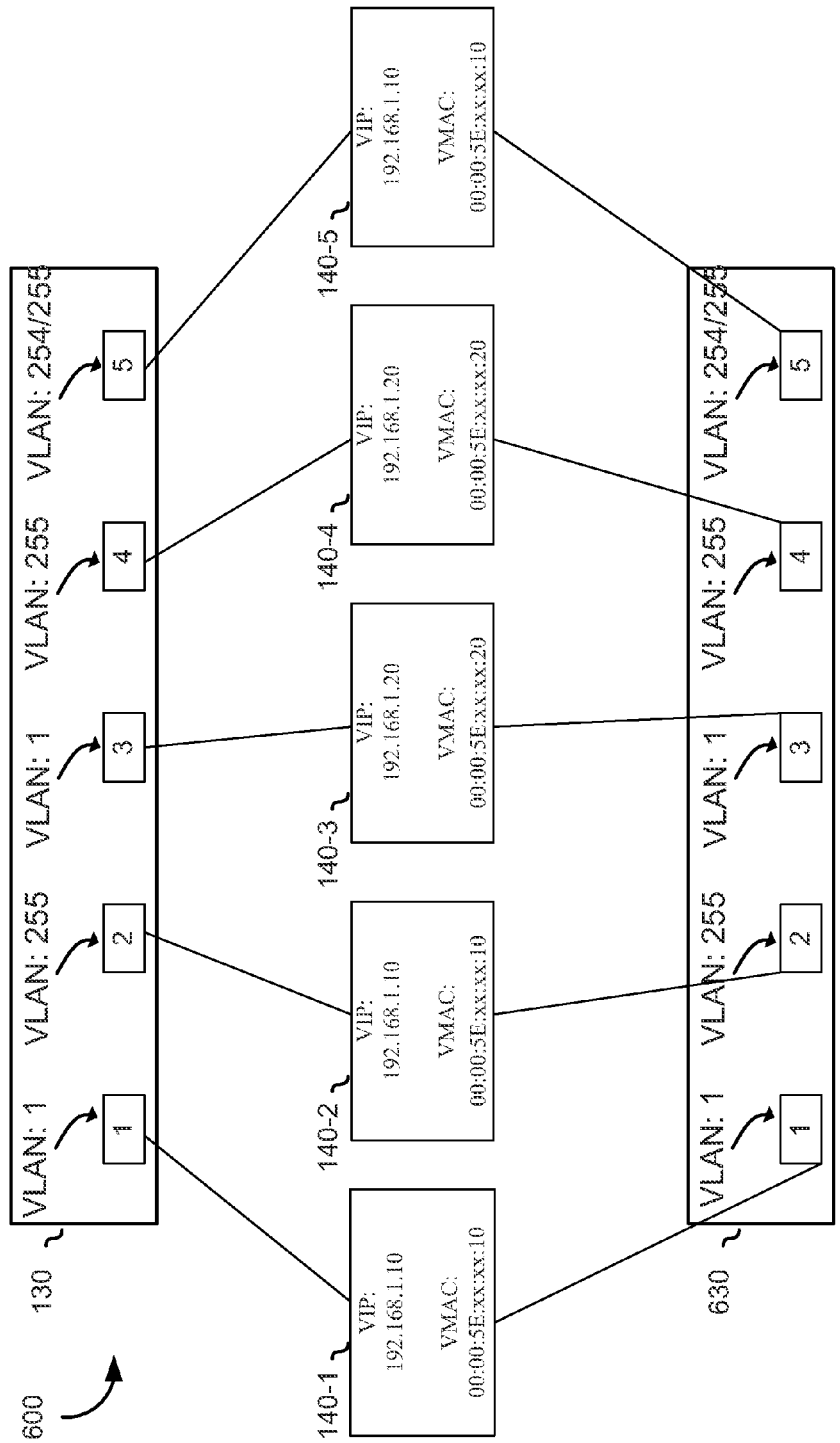
FIG. 6 is an example system that may be set up to provide failover.

FIG. 6 is an example system that may be set up to provide failover 600. FIG. 6 will be described below with reference to FIG. 1. System 600 may include switch 130, a switch 630, and devices 140-1 through 140-5. Each one of switch 130 and switch 630 may include ports 1 through 5. Switch 130 and switch 630 may connect to network 120, either directly or indirectly. Each one of switch 130 and switch 630 may work independently or together with the other switch. Switch 130 and switch 630 may be connected to each other. In another implementation, switch 130 and switch 630 may be connected to another device that may handle failover between switch 130 and switch 630.

An administrator may install software on switch 130 and switch 630 for switch 130/switch 630 to handle/provide failover. In other implementations, software may be pre-installed on switch 130 and switch 630 or may be remotely installed by/using another device (e.g., a switch or server connected to switch 130 and switch 630) on switch 130 and switch 630. The administrator may connect each one of devices 140-1 through 140-5 to one of ports 1 through 5 on switch 130 and to one of ports 1 through 5 on switch 630. Each one of devices 140-1 through 140-5 may also be connected to another switch that may act in the same way as switch 130 and switch 630. Herein, any reference to switch 130 may apply to switch 630 or any other switch connected to devices 140-1 through 140-5. There may be no need for additional failover packages or configuration files to be installed on any one of individual devices 140-1 through 140-5 for failover to work.

One or more VLANS, including VLAN 1, may be reserved for devices that act as masters. And one or more VLANs, including VLAN 255 and VLAN 254, may be reserved for devices that act as slaves. An administrator may reserve different VLANs to correspond to different devices based on their role (master or slave). In another implementation, switch 130 may automatically allocate the different VLANs.

An administrator may set up system 600 to provide failover, for example, for a type of device that acts as a web server for a specific website and for a type of device that acts as a file server. The administrator may select and set-up devices 140-1, 140-2, and 140-5 to be able to individually perform an identical role (operations/functions) of the web server. The administrator may assign an identical VIP address of 192.168.1.10 and an identical VMAC address of 00:00:5E:xx:xx:10 to devices 140-1, 140-2, and 140-5.

The administrator may select and set-up devices 140-3 and 140-4 to be able to individually perform an identical role (operations/functions) of the file server. The administrator may assign an identical VIP address of 192.168.1.20 and an identical VMAC address of 00:00:5E:xx:xx:20 to devices 140-3 and 140-4. In another implementation, the process of selecting and assigning VIP and VMAC addresses may be automated using a script, based on a set of rules, etc. and handled by switch 130 or another computer system (e.g., a DHCP server).

Switch 130 may transmit requests to devices 140-1 through 140-5. Assume that, switch 130 receives a response to the requests from device 140-1 before any other device 140-2 through 140-5. Based on the response, switch 130 may determine that the VMAC address of device 140-1 is 00:00:5E:xx:xx:10. Switch 130 may determine whether switch 130 has already received a reply from another device with the VMAC address of 00:00:5E:xx:xx:1. In one implementation, switch 130 may make the determination using a table in switch 130 storing the relevant information. In another implementation, switch 130 may make the determination based on whether any port of switch 130 is assigned to VLAN 1 that connects to the another device with the VMAC address of 00:00:5E:xx:xx:10. Since device 140-1 was the first device with the VMAC address of 00:00:5E:xx:xx:1 to reply to a request from switch 130, there are no ports assigned to VLAN 1 that connect to a device with the VMAC address of 00:00:5E:xx:xx:10. As a result, switch 130 may identify device 140-1 as a master/primary device to perform the functions of the web server (device with VMAC address of 00:00:5E:xx:xx:10). For device 140-1 to act as a master, switch 130 may assign port 1, corresponding to device 140-1, of switch 130 to VLAN 1.

At some later point, assume that switch 130 receives a response from device 140-2. Switch 130 may determine that the VMAC address of device 140-2 is also 00:00:5E:xx:xx:10. Since port 1, corresponding to device 140-1 with the VMAC address of 00:00:5E:xx:xx:10, is already assigned to VLAN 1, switch 130 may assign port 2, corresponding to device 140-2, to VLAN 255.

Switch 130 may also receive a response from device 140-3. Based on the response, switch 130 may determine that the VMAC address of device 140-3 is 00:00:5E:xx:xx:20. Switch 130 may determine that switch 130 has not already received a reply from another device with the VMAC address of 00:00:5E:xx:xx:20. Accordingly, switch 130 may identify device 140-3 as a master/primary device to perform the functions of the file server. For device 140-3 to act as the master, switch 130 may assign port 3, corresponding to device 140-3, to VLAN 1.

Assume that after the response is received from device 140-3, switch 130 receives a response from device 140-4. Switch 130 may determine that the VMAC address of device 140-4 is also 00:00:5E:xx:xx:20, like that of device 140-3. Since port 3, corresponding to device 140-3, with the VMAC address of 00:00:5E:xx:xx:20, is already assigned to VLAN 1, switch 130 may assign port 4, corresponding to device 140-4, to VLAN 255. Device 140-4 may now act as a slave in relation to device 140-3 that is acting as a master for devices with the VMAC address of 00:00:5E:xx:xx:20.

Assume that after receiving responses from devices 140-1 and 140-2, switch 130 receives a response from device 140-5. Switch 130 may determine, based on the response, that the VMAC address of device 140-5 is 00:00:5E:xx:xx:10, like that of devices 140-1 and 140-2. Switch 130 may determine that port 1, corresponding to device 140-1 with the VMAC address of 00:00:5E:xx:xx:10, is already assigned to VLAN 1. As a result, switch 130 may identify device 140-5 as a slave (in addition to device 140-2) in relation to other devices with the VMAC address of device 140-5, including device 140-1 that is acting as a master. In one implementation, switch 130 may assign port 5, corresponding to device 140-5, to VLAN 255. In another implementation, switch 130 may determine that port 2, corresponding to device 140-2 with the VMAC address of 00:00:5E:xx:xx:10, is already assigned to VLAN 255. In this case, switch 130 may assign port 5, corresponding to device 140-5, to another VLAN reserved for slaves (e.g., VLAN 254).

A user at computer terminal 110 (FIG. 1) may prompt (e.g., enter a URL into a browser, click on a hyperlink, etc.) computer terminal 110 to transmit a user request for data (e.g., web pages, HTML) for a website (e.g., Juniper.net). The user request may be transmitted from computer terminal 110 to switch 130. Switch 130 may determine, based on the user request from computer terminal 110, that a device with the VMAC address of 00:00:5E:xx:xx:10 needs to process the request. Switch 130 may determine whether a port, corresponding to a device with the VMAC address of 00:00:5E:xx:xx:10, is assigned to VLAN 1. Switch 130 may determine that port 1 is assigned to VLAN 1 and is connected to device 140-1 with the VMAC address of 00:00:5E:xx:xx:10. As a result, device 140-1 is acting as a master and may process the user request. Switch 130 may transmit the user request to device 140-1. Device 140-1 may process the user request and transmit data for the website back to computer terminal 110 through switch 130 and network 120. Computer terminal 110 may display the website based on the data.

Switch 130 may detect a failure of device 140-1 that is acting as a master by, for example, failing to receive a reply or a proper reply to a heartbeat message. In response, switch 130 may reassign port 2, corresponding to device 140-2 with the same VMAC address as device 140-1 (00:00:5E:xx:xx:10), to VLAN 1. Device 140-2 may now act as a master and process any user requests from computer terminal 110 destined for the web server (a device with the VMAC address of 00:00:5E:xx:xx:10). Thereafter, switch 130 may detect a failure of device 140-2. If device 140-1 has not become active, switch 130 may reassign port 5, corresponding to device 140-5 with the same VMAC address as devices 140-1 and 140-2 (00:00:5E:xx:xx:10), to VLAN 1. At this point, device 140-5 may act as a master and process any user requests from computer terminal 110 destined for the web server (a device with the VMAC address of 00:00:5E:xx:xx:10).

Switch 130 may continue to transmit requests to devices 140-1 and 140-2 to check whether either one (or both) of devices 140-1 and 140-2 is able to operate as a web server in order to act as a backup for device 140-5. Switch 130 may receive a response to one of the requests from one or both of devices 140-1 and 140-2. Accordingly, switch 130 may assign ports 1 and/or 2 of devices 140-1 and/or 140-2, respectively, to VLAN 254 and/or VLAN 255 for device(s) 140-1 and/or 140-2 to act as slaves in relation to device 140-5 that is acting as a master.

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks has been described with regard to FIG. 5, the order of the blocks may be modified in other implementations. Further, non-dependent blocks may be performed in parallel.

It will be apparent that example aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

While reference has been made to assigning VLAN 1 to masters and VLAN 255 or 254 to slaves, these VLANS are simply examples. In practice, any particular VLAN (or VLANs) may be designated for masters and any other particular VLAN (or VLANs) may be designated for slaves.

What is claimed is:
1. A method comprising:
sending, by a network device, a first request to a first device;
sending, by the network device, a second request to a second device;
receiving, by the network device and from the first device, a first reply to the first request;

determining, by the network device, a virtual media access control (VMAC) address of the first device based on the first reply;
determining, by the network device, whether a virtual local area network (VLAN) that is reserved for masters is assigned to any port that is connected to any device with the VMAC address; and
identifying, by the network device, the first device as a master device based on determining whether the VLAN that is reserved for masters is assigned to any port that is connected to any device with the VMAC address.

2. The method of claim 1, further comprising:
receiving, by the network device and from the second device, a second reply to the second request; and
identifying, by the network device, the second device as a slave device based on the second reply and based on identifying the first device as the master device.

3. The method of claim 1, further comprising:
receiving traffic;
determining an address based on the traffic;
detecting a failure of the first device; and
caching the traffic based on determining the address and after detecting the failure of the first device.

4. The method of claim 1, further comprising:
detecting a failure of the first device; and
reassigning, after detecting the failure of the first device, a port, of the network device, that is connected to the second device.

5. The method of claim 4, where reassigning the port comprises:
identifying, after detecting the failure of the first device, that the second device has an address of the first device; and
reassigning the port based on identifying that the second device has the address of the first device.

6. The method of claim 4,
where reassigning the port comprises:
reassigning the port from a first VLAN to a second VLAN,
where the first VLAN is reserved for ports connected to devices acting as slaves, and
where the second VLAN is reserved for ports connected to devices acting as masters.

7. The method of claim 1, further comprising:
detecting a failure of the first device;
identifying the second device to act as the master device after detecting the failure of the first device;
transmitting a heartbeat message to the first device;
receiving a reply to the heartbeat message from the first device; and
identifying the first device as a slave device based on receiving the reply to the heartbeat message from the first device.

8. A system comprising:
a memory; and
one or more processors, connected to the memory, to:
send a first request to a first device;
send a second request to a second device;
receive, from the first device, a first reply to the first request;
determine a virtual media access control (VMAC) address of the first device based on the first reply;
determine whether a virtual local area network (VLAN) that is reserved for masters is assigned to any port that is connected to any device with the VMAC address; and
identify the first device as a master device based on determining whether the VLAN that is reserved for masters is assigned to any port that is connected to any device with the VMAC address.

9. The system of claim 8, where the one or more processors are further determine the VMAC address of the first device based on the first reply; and
determine, before identifying the first device as the master device, that the first device is able to perform functions required by a device with the VMAC address of the first device.

10. The system of claim 8, where the one or more processors are further to:
receive, from the second device, a second reply to the second request;
determine a VMAC address of the second device based on the second reply;
determine that the VMAC address of the second device is the VMAC address of the first device; and
identify the second device as a slave device based on determining that the VMAC address of the second device is the VMAC address of the first device.

11. The system of claim 8, where the one or more processors are further to:
determine a failure of the first device;
determine that the second device has a VMAC address of the first device; and
identify the second device as the master device based on determining the failure of the first device and based on determining that the second device has VMAC address of the first device.

12. The system of claim 8, where the one or more processors are further to:
determine a failure of the first device; and
assign, based on determining the failure of the first device, a port, connected to the second device, to a VLAN reserved for ports connected to devices acting as masters.

13. The system of claim 8, where the one or more processors are further to:
determine a failure of the first device;
cache traffic destined to a VMAC address of the first device and the second device;
identify the second device as the master device based on determining the failure of the first device; and
transmit the traffic to the second device after identifying the second device as the master device.

14. A system comprising:
a first network device, implemented at least partially in hardware, that includes a first port and a second port,
the first port being connected to a first device,
the first port being assigned to a first virtual local area network (VLAN) that is reserved for ports connected to devices acting as masters,
the second port being connected to a second device, and
the second port being assigned to a second VLAN that is reserved for ports connected to devices acting as slaves; and
a second network device, implemented at least partially in hardware, that includes a third port and a fourth port,
the third port being connected to the first device, and
the fourth port being connected to the second device.

15. The system of claim 14, further comprising:
a third device, implemented at least partially in hardware, that handles failover between the first network device and the second network device.

16. The system of claim 14, where a virtual media access control (VMAC) address of the first device is same as a VMAC address of the second device.

17. The system of claim 14, where the first network device is to:
send a first request to the first device,
receive, from the first device, a first reply to the first request, and
assign the first port to the first VLAN based on the first reply.

18. The system of claim 17,
where the first network device is further to:
send a second request to the second device, and
receive, from the second device, a second reply to the second request,
where, when assigning the first port to the first VLAN, the first network device is to:
determine that the first reply was received from the first device before the second reply was received from the second device, and
assign the first port to the first VLAN based on determining that the first reply was received from the first device before the second reply was received from the second device.

19. The system of claim 14,
where the first network device includes a fifth port and a sixth port,
the fifth port being connected to a third device,
the fifth port being assigned to the first VLAN,
the sixth port being connected to a fourth device, and
the sixth port being assigned to the second VLAN, and
where the second network device includes a seventh port and an eighth port,
the seventh port being connected to the third device, and
the eighth port being connected to the fourth device.

20. The method of claim 1, further comprising:
determining that the network device receives the first reply from the first device before receiving a second reply to the second request from the second device.

* * * * *